UNITED STATES PATENT OFFICE.

GEORGE H. EARP-THOMAS, OF BLOOMFIELD, NEW JERSEY.

MEANS FOR DISTRIBUTING SOIL BACTERIA.

1,099,121. Specification of Letters Patent. Patented June 2, 1914.

No Drawing. Application filed June 29, 1908. Serial No. 441,018.

*To all whom it may concern:*

Be it known that I, GEORGE H. EARP-THOMAS, a British subject, residing at Bloomfield, county of Essex, and State of New Jersey, have invented certain new and useful Improvements in Means for Distributing Soil Bacteria, fully described in the following specification.

This invention relates to the distribution of beneficial soil bacteria.

The desirability and practical necessity of having soils for growing all kinds of plants and crops supplied with the various species and varieties of beneficial soil bacteria is very generally recognized. Efforts to supply such bacteria to soils which are naturally deficient in them have been directed mainly to supplying the particular species of nitrogen fixing, or nitrifying, bacteria which enter the roots of leguminous plants usually forming nodules or swellings on the roots containing colonies of the bacteria, and which, like other species of nitrifying bacteria which exist independently of growing plants, fix atmospheric nitrogen in a form assimilable by plants. Two methods of supplying these nodule-forming nitrifying bacteria to soils which are naturally deficient in them have been heretofore followed; one being by distributing on the land soil from fields containing the desired bacteria, and the other by inoculating the soil or the seeds before planting with pure laboratory prepared cultures of the desired bacteria. The first of these methods, that is, the method of soil transfer, is objectionable because of the danger of spreading weeds, destructive crop diseases and harmful bacteria.

The object of the present invention is to provide an improved method and means for distributing nodule-forming nitrifying bacteria and other kinds of beneficial soil bacteria whereby any advantages belonging to the soil transfer method of inoculation, above referred to, are retained, and the disadvantages and objections to such method of inoculation entirely avoided and overcome. To this end, I propose to distribute for inoculation purposes, soil which has been freed from weed seeds and all harmful germs and bacteria, and which is inoculated with artificially or laboratory prepared pure cultures of the desired beneficial bacteria.

My method of preparing such inoculated soil is briefly as follows:—I take a quantity of soil which is favorable to the growth of the bacteria and treat the same to kill all weed seeds, disease germs and all organisms which it may contain. For this purpose, the soil is preferably sterilized by steam or dry heat, preferably the latter. A practical method of sterilizing the soil is to pass it in an even layer slowly over a sufficiently heated iron sheet, the soil being stirred and turned as it is passed over the heated surface. It may also be sterilized by the use of any suitable form of apparatus, such as is used for roasting ores or minerals; as, for example, a revolving cylinder heated to the desired degree provided with a spiral guide or flange on its interior surface by which the soil will be advanced gradually through the cylinder and at the same time agitated and stirred so as to insure the proper heating of all parts of the same. The soil thus sterilized and freed of its weed seeds, all weed seeds which it contains having been killed by the heat, is then inoculated with the desired beneficial bacteria. Artificially prepared pure cultures are used for this purpose, and the inoculation is preferably performed by mixing with the sterilized soil a more or less diluted solution of the culture, the amount of bacteria used depending upon the amount of the inoculated soil which is to be used for inoculating a given area of land.

If soil of the proper character and composition is used, the bacteria will thrive in the same, increasing in numbers and remaining in an active and virile condition for a considerable length of time, and the inoculated soil may be shipped to all parts of the world with the certainty that it will reach its destination in good condition.

The inoculated soil may be sown on the land like seed in the condition it is received by the user, but a preferred method of using it is to mix the amount of soil furnished for an acre of ground with, say, a cartload of soil from the field to be inoculated and then spread such soil evenly over the field, harrowing it in as soon as possible.

The soil to be sterilized and inoculated should be of a character favorable to the growth of the desired bacteria, containing the necessary elements for sustaining the bacterial life, but almost any ordinary garden soil may be used. It is preferable, however, to use a non-nitrogenous soil, or one which is free, or substantially free from nitrogen. This for the same purpose that it is desirable in growing laboratory cultures to use a non-nitrogenous medium, that is, to cause and accustom the bacteria to take the nitrogen which they require from the air rather than to feed on nitrogen contained in the soil. If the soil is lacking in carbonates or carbo-hydrates or other elements or substances which the bacteria require, they should be supplied. As the soil is to be quite heavily inoculated with bacteria it should contain a comparatively large supply of carbonaceous matter, and if the carbonaceous matter is not in the soil in sufficient quantities this is corrected preferably by the addition of nitrogen-poor humus or clay-loam, or better, both clay-loam and humus; or the elements lacking may be supplied in chemical form. Ordinary garden soil with the addition of say 10 to 20 per cent. of humus and clay-loam will usually be found to contain all necessary substances for the growth of the bacteria. Of course much larger relative quantities of these substances may be used if desired, or clay-loam alone or a mixture of clay-loam and nitrogen-poor humus would answer the purpose well.

When humus and clay-loam, or either of them, is added to the soil, they may be added before sterilization, and the combined soil then treated to sterilize it and kill the weed seeds; or the constituents may be separately treated. A good method is to sterilize clay-loam which is to be added to the soil separately from the main body of the soil, and then to inoculate it and mix the moistened and inoculated clay-loam with the main portion of the sterilized soil. When the sterilizing is done by dry heat, it is sometimes desirable to add carbo-hydrates in the form of sugar, maltose or its equivalent to the soil after it is sterilized. Unless carbonaceous matter is to be added after sterilization, the temperature during sterilization must not be high enough to destroy the carbonaceous matter in the original soil.

For most forms of the nodule-forming bacteria, the soil should be neutral or slightly alkaline, and if the soil to be used should be acid, this should be corrected by the addition of a suitable quantity of lime, preferably in the form of carbonate of lime. With regard to the physical condition of the soil, it is desirable that it be of a light character to admit air readily, friable, of fine texture, and of an absorbent nature.

The soil may be inoculated with a single species or variety of beneficial bacteria, or with a plurality of species or varieties. Soil for inoculating land for growing a particular species of legume may be inoculated with only the particular kind or variety of nodule-forming bacteria corresponding to the particular legume; or the soil may be inoculated with the various kinds or varieties of nodule-forming bacteria belonging to the commonly used legumes, either by inoculating with separate cultures of each different variety of the bacteria or with a composite culture containing the various varieties of these nodule-forming bacteria with which the sterilized soil is to be inoculated. Such composite cultures for inoculating the soil may be produced as set forth in United States Letters Patent No. 865,965, granted to me September 10th, 1907. Soil inoculated with nodule-forming bacteria specific to the several legumes may be used for inoculating land for growing any of such legumes or their closely related species. In order to produce an inoculated soil for inoculating land for growing various kinds of legumes, it will not be necessary in practice to inoculate with the specific bacteria for each of the various species of legumes to be grown, but it will usually be sufficient to inoculate with bacteria specific to one or more species of each of the different groups of closely related species of legumes. For example, soil inoculated with bacteria specific to red clover would answer for inoculating land for growing alsike or white clover.

In preparing inoculated sterilized soil for inoculating land for growing legumes, I prefer to inoculate the soil not only with the nodule-forming bacteria, but also with other kinds of beneficial soil bacteria, such as the independent or non-symbiotic nitrifying bacteria, and the peptonizing and ammonifying bacteria.

The use of inoculated soil prepared in accordance with this invention is, of course, not limited to the inoculation of land for growing leguminous crops. Sterilized soil may be inoculated with other forms of bacteria such as have been already isolated or which may hereafter be isolated which are specific to various crops other than legumes; and soil inoculated with the independent forms of nitrifying bacteria and preferably also with the peptonizing and ammonifying bacteria or other forms of beneficial bacteria will be found to be of value for general use for inoculating land which is deficient in such bacteria. It is also desirable to have the inoculated sterilized soil prepared for such general use inoculated with the nodule-forming or legume bacteria.

While for most forms of beneficial bacteria the soil should be, as before stated, neutral or slightly alkaline, yet certain forms of nodule-forming bacteria specific to certain legumes thrive best in a slightly acid medium or soil, and in order to get the best growth and most marked results from these particular bacteria the soil to be inoculated should preferably be in a slightly acid condition. The bacteria specific to cow peas, for example, thrive best in a soil which is slightly acid. Soil to be inoculated with the bacteria specific to cow peas, therefore, should not be limed, but should be allowed to remain slightly acid, or should be made so by the addition of a suitable substance such as acid sulfates or acid phosphates. Most of the legumes, however, and their corresponding bacteria thrive best on a neutral or slightly alkaline soil, as above stated. Some, moreover, do slightly better on a soil just neutral, while others are favored by a slightly alkaline condition of the soil. I prefer, therefore, in preparing inoculated soil to be used for inoculating land for growing the various species of legumes to use soil of three different qualities with respect to their acid or alkaline condition, that is, I would use a slightly alkaline soil for inoculating for legumes which thrive best in an alkaline soil; a neutral soil for legumes which thrive best in a neutral soil; and a slightly acid soil for legumes which thrive best in a slightly acid soil.

A good method of securing the best soil to use in preparing inoculated sterilized soil in accordance with this invention, is to select soil for a particular species or group of legumes from a locality where legumes of that particular species or group have grown well and have been well supplied with healthy root nodules. After being sterilized and inoculated, the soil should be protected against contamination, especially against access of molds and other harmful organisms. The degree of protection required while being stored and during shipment will depend largely on the amount of moisture in the inoculated soil. If the soil is quite dry, molds and other organisms will not readily penetrate into it and it could be shipped in bags or ordinary boxes. If the soil is too dry, however, the growth of the beneficial bacteria will be retarded, and it is desirable to have the soil moistened sufficiently so that its condition will be favorable for their growth and development. In such moistened condition, however, molds and other harmful organisms are more liable to develop on and spread through the soil, and such moistened inoculated soil should, therefore, be sealed against access of molds and other harmful organisms in suitable receptacles for shipment, and preferably should be sealed immediately after inoculation. It is desirable that inoculation should take place as soon as the soil is cooled sufficiently after being sterilized and without its having been allowed to become contaminated. If the inoculated soil is to be kept for a considerable length of time after being sealed against access of molds and other harmful organisms, or of air laden with such, provision is preferably made for allowing sterilized air to enter the receptacle containing the inoculated soil. This may readily be accomplished by providing the receptacle with an opening which is filled with properly compacted sterilized cotton.

A good way of distributing the inoculated sterilized soil is to have a small quantity of such soil which is in a moistened condition surrounded by dry sterilized soil, which dry soil may be uninoculated sterilized soil, but which preferably will also be inoculated. The soil may be packed in this way by putting a layer of the dry soil in the bottom of a box or other receptacle, placing the moist soil on the center of said layer and then filling up the box with the dry soil. The moist soil in the center of the box will thus be entirely surrounded by dry soil. Another way of securing this result is to pack dry sterilized soil in a receptacle in which it is to be shipped and then by means of a suitable spray, syringe or other suitable instrument to inject into the center of the dry soil a sufficient quantity of liquid culture to moisten and inoculate the soil at and near the center of the package. The advantage of this method of distributing inoculated soil, that is, with moist soil surrounded with dry soil, is that the moist soil in the center will be in a condition most favorable for the development and growth of the bacteria and will be protected by the dry soil against molds and other harmful organisms. When packed in this way, the inoculated soil may be safely distributed over long distances and kept for a long time when packed in ordinary wooden boxes or even in bags.

What is claimed is:—

1. As a new article of manufacture, substantially nitrogen-free soil freed of weed seeds and harmful organisms but containing available carbonaceous matter, and artificially inoculated with beneficial soil bacteria.

2. As a new article of manufacture, substantially nitrogen-free soil containing clay and available carbonaceous matter and freed from weed seeds and harmful organisms, and artificially inoculated with beneficial soil bacteria.

3. As a new article of manufacture, soil composed of a mixture of garden soil, humus and clay-loam, the quantity of the humus and clay-loam being less than the quantity of garden soil in the mixture, and said mixed soil being freed from weed seeds and harmful organisms, and inoculated with beneficial soil bacteria.

4. As a new article of manufacture, substantially nitrogen-free soil which has been sterilized by heat, containing available carbonaceous matter and inoculated with beneficial soil bacteria.

5. As a new article of manufacture, sterilized substantially nitrogen-free soil containing available carbonaceous matter and inoculated with pure cultures of beneficial soil bacteria.

6. As a new article of manufacture, sterilized substantially nitrogen-free soil containing available carbonaceous matter and inoculated with pure cultures of nitrifying bacteria.

7. As a new article of manufacture, sterilized substantially nitrogen-free soil containing available carbonaceous matter and inoculated with pure cultures of nodule-forming nitrifying bacteria.

8. As a new article of manufacture, sterilized substantially nitrogen-free soil inoculated with pure cultures of a plurality of kinds of nitrifying bacteria.

9. As a new article of manufacture, sterilized substantially nitrogen-free soil inoculated with pure cultures of a plurality of kinds of nodule-forming nitrifying bacteria.

10. As a new article of manufacture, sterilized soil inoculated with pure cultures of nodule-forming nitrifying bacteria and independent or non-symbiotic nitrifying bacteria.

11. As a new article of manufacture, sterilized soil inoculated with nitrifying, peptonizing and ammonifying bacteria.

12. As a new article of manufacture, sterilized soil inoculated with nodule-forming and independent or non-symbiotic nitrifying bacteria, peptonizing bacteria and ammonifying bacteria.

13. A new article of manufacture comprising substantially nitrogen-free soil freed of weed seeds and harmful organisms and inoculated with beneficial soil bacteria, and a protective envelop comprising pulverulent material inclosing said soil and preventing access of molds and other harmful organisms thereto.

14. A new article of manufacture comprising sterilized substantially nitrogen-free soil inoculated with beneficial soil bacteria, and a protective envelop of inorganic material pervious to air inclosing said soil and preventing access of molds and other harmful organisms thereto.

15. As a new article of manufacture, a body of soil comprising soil inoculated with pure cultures of beneficial soil bacteria, a localized portion of said body having a greater moisture content than and being protected by the remainder of said body.

16. A new article of manufacture comprising moist sterilized soil inoculated with beneficial soil bacteria, a layer of dry soil enveloping said moist soil and a closed receptacle inclosing both said soils and having an air-supply opening filled with compacted sterilized cotton.

17. As a new article of manufacture, a body of moist sterilized soil inoculated with beneficial soil bacteria and surrounded by dry sterilized soil.

18. As a new article of manufacture, a body of moist sterilized soil inoculated with beneficial soil bacteria and protected by dry sterilized soil.

19. As a new article of manufacture, a body of moist sterilized soil surrounded with dry sterilized soil, both the moist and the dry soil being inoculated with beneficial soil bacteria.

20. As a new article of manufacture, a body comprising both moist and dry soil in substantially separate arrangement, said soil being freed of weed seeds and harmful organisms and inoculated with beneficial soil bacteria, said moist soil being protected by said dry soil.

21. As a new article of manufacture, a moist medium inoculated with bacteria and surrounded by a dry powdered material.

22. As a new article of manufacture, a moist medium inoculated with bacteria and protected by a dry powdered material.

In testimony whereof, I have hereunto set my hand, in the presence of two subscribing witnesses.

GEORGE H. EARP-THOMAS.

Witnesses:
HARRY S. CONNOLLY,
A. L. KENT.